Patented Feb. 28, 1928.

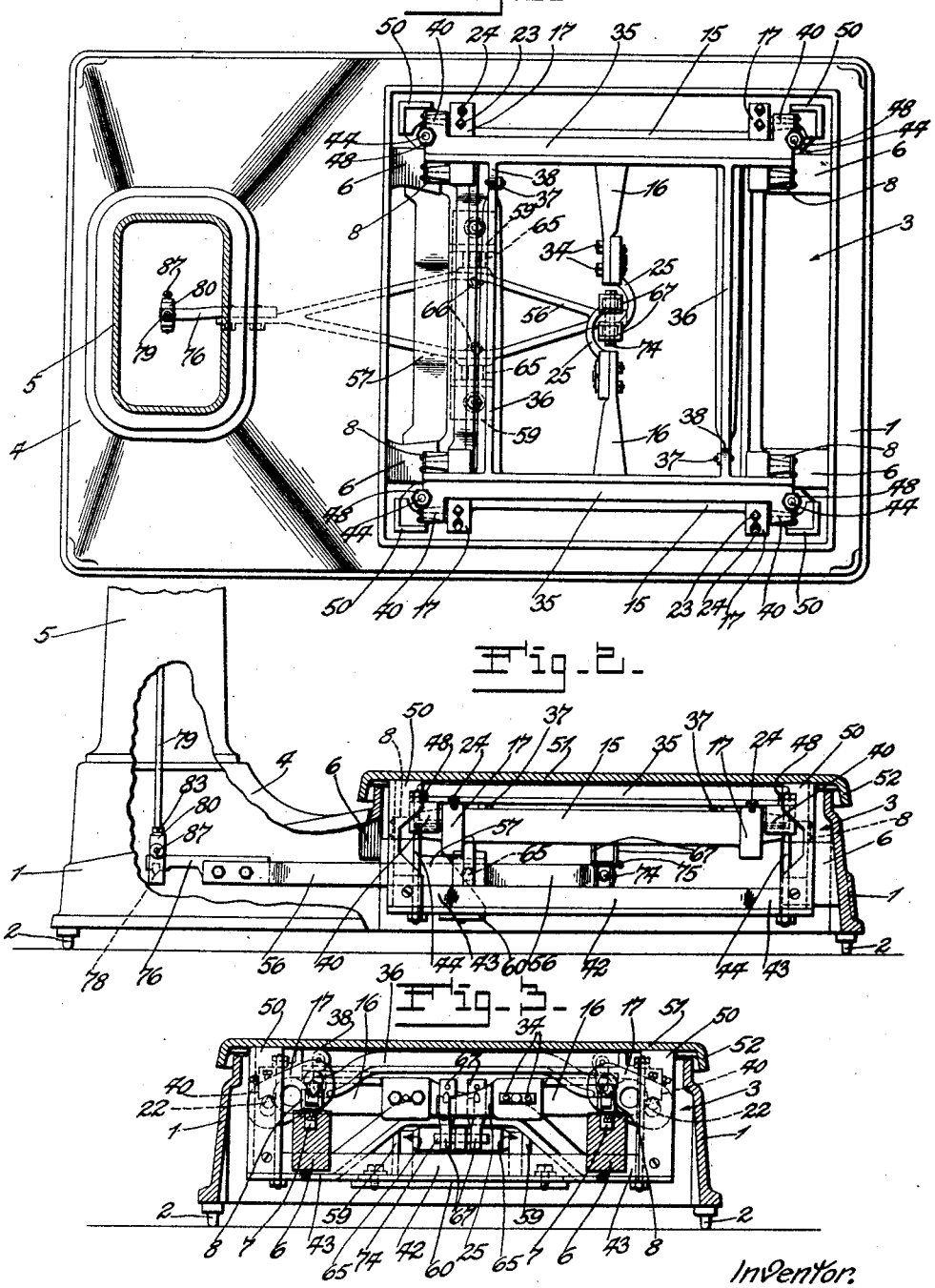

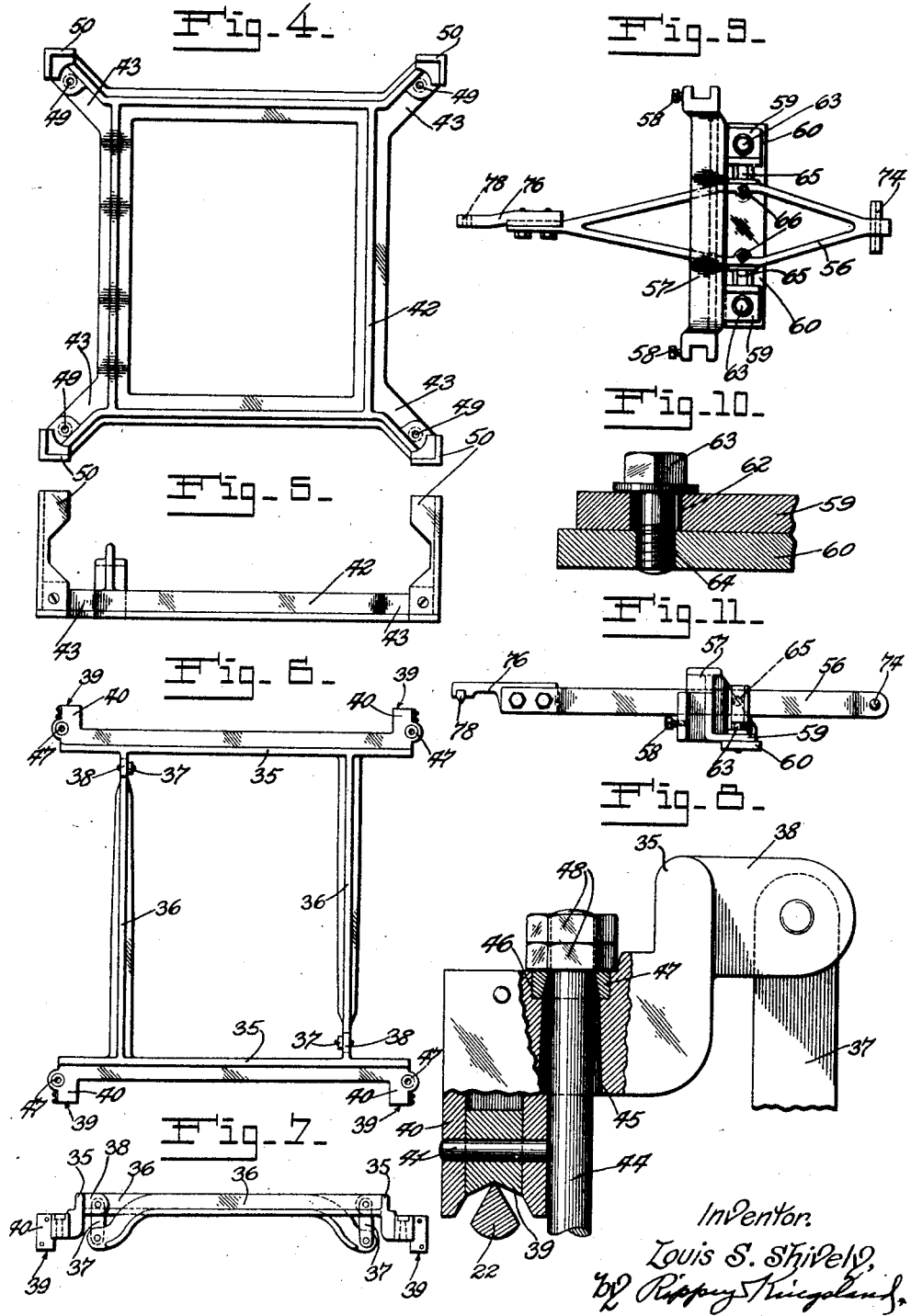

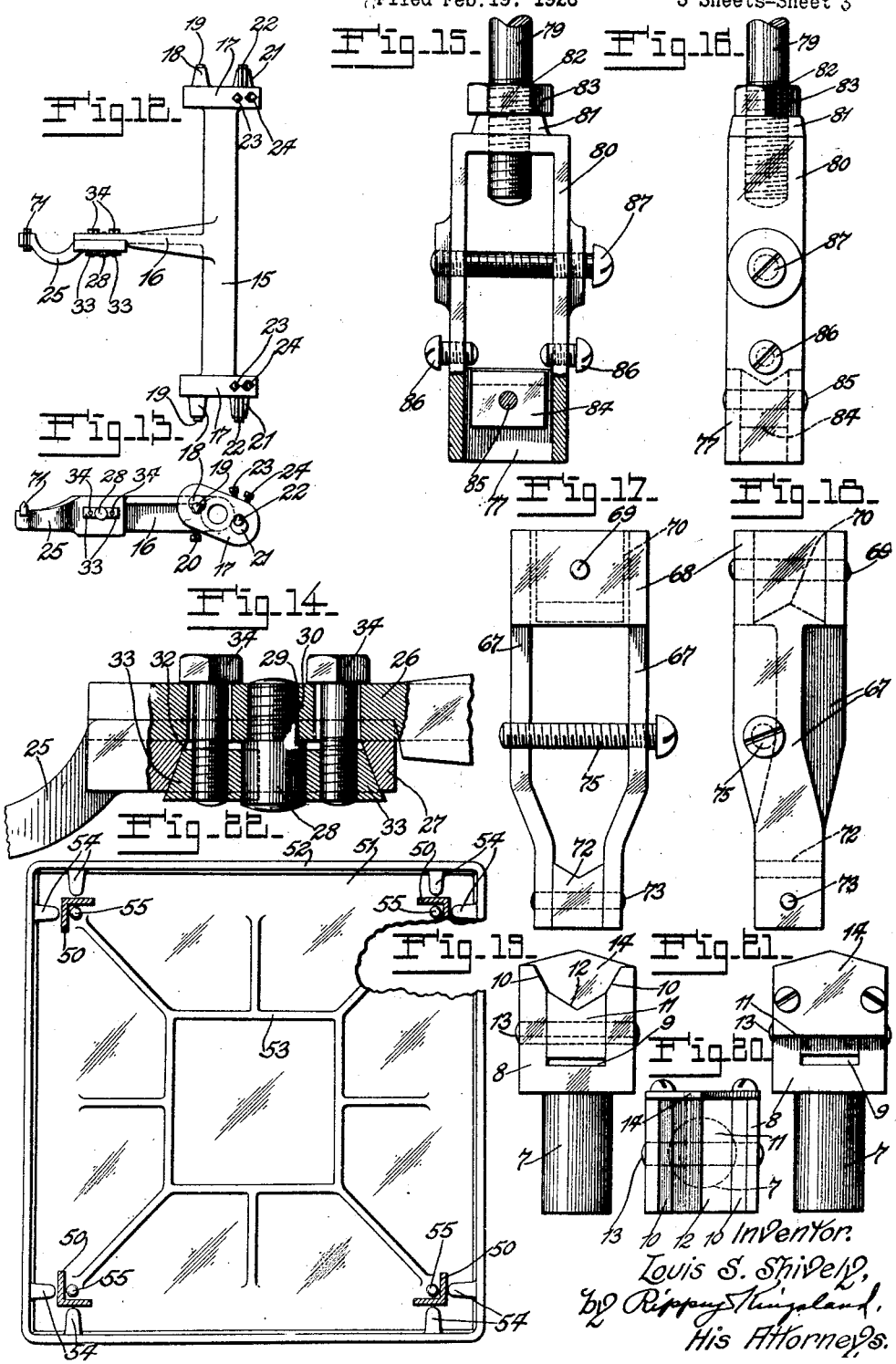

1,660,820

UNITED STATES PATENT OFFICE.

LOUIS S. SHIVELY, OF ST. LOUIS, MISSOURI, ASSIGNOR TO THE WEIGHTOGRAPH COMPANY, OF ST. LOUIS, MISSOURI, A CORPORATION OF MISSOURI.

SCALE.

Application filed February 19, 1926. Serial No. 89,293.

This invention relates to improvements in scales and consists in the novel construction hereinafter disclosed.

An object of the invention is to provide in a platform scale a floating underslung frame carrying supports for the platform, said frame being yieldably connected with the weighing mechanism, whereby the platform may be loaded at any point of its area without tilting the platform or disturbing the bearings of the weighing mechanism.

Another object of the invention is to provide in a scale, a platform support including an underslung frame having flexible connection with the weighing mechanism so designed and coordinated with the platform that the load may be distributed upon the platform upon any area thereof without oscillating the platform and thereby causing vibration in the weighing mechanism.

Another object of the invention is to provide in a platform scale, means for supporting the platform and connecting the same with the weighing mechanism so that the support for the platform will extend to the marginal edges thereof, thus preventing tilting and vibration of the platform when being loaded.

Another object of the invention is to provide in a platform scale, a construction in which the load levers are levers of the first class, and are connected with the load adjacent to the corners of the platform thereby preventing tilting and oscillation of the platform when being loaded.

Another object of the invention is to provide self-alining bearings for the levers of the weighing mechanism.

Another object of the invention is to provide improved means for effecting the adjustment of the several parts of the weighing mechanism.

Another object of the invention is to simplify the means of adjusting the several parts of the weighing mechanism so that the scale may be accurately calibrated and will maintain a substantially permanent adjustment.

Additional detailed advantages of the construction will be apparent from the following description, taken in connection with the accompanying drawings in which, Fig. 1 is a plan view of the invention with the platform removed;

Fig. 2 is a vertical longitudinal section;
Fig. 3 is a vertical cross section;
Fig. 4 is a plan view of the underframe;
Fig. 5 is a side elevation of the same member;
Fig. 6 is a plan view of the flexible load bearing frame;
Fig. 7 is an end elevation of the same;
Fig. 8 is an enlarged detail view of a portion of the load bearing frame illustrating the mounting thereof, and the means of connecting the underframe therewith;
Fig. 9 is a plan view of the transverse extension lever, the nose iron therefor, and the fulcrum supports for the same;
Fig. 10 is a detail view of the centering adjustment for the transverse extension lever;
Fig. 11 is a side elevation of the same;
Fig. 12 is a plan view of one of the main levers and nose iron therefor;
Fig. 13 is an end view thereof;
Fig. 14 is a detail view of the adjusting device for one of the main lever nose irons;
Fig. 15 is a detail view of the adjustable steelyard rod shackle;
Fig. 16 is an end view of the same part;
Fig. 17 is a front view of the adjustable shackle connecting the main lever and the transverse extension lever;
Fig. 18 is a side view thereof;
Fig. 19 is an inner face elevation of one of the self-alining bearings for the fulcrum of the main lever;
Fig. 20 is a plan view thereof;
Fig. 21 is a front face elevation of the same part; and
Fig. 22 is a bottom plan view of the load platform.

In the embodiment of the invention illustrated in the drawing, the structure is shown as including a main frame 1 designed to form a case for the weighing mechanism and provided with levelling screws 2 adjacent to each corner thereof for the purpose of leveling the scale. The forward portion of the frame has a rectangular opening 3 therein beneath which the scale levers and their connections are mounted. The rearward portion of the frame is designed to form a base 4 for the scale pillar 5.

The main scale levers, one of which is illustrated in detail in Figs. 12 and 13, are arranged to be supported by the main frame beneath each side of the opening 3, the supports for the levers comprising four lugs 6 disposed adjacent to the four corners of the rectangular forward portion of the scale frame. The lugs are preferably made integral with the main frame casting and have vertical openings in the top face thereof. The bearing blocks for the main lever fulcrums are carried in supports, comprising a cylindrical base portion 7 and an enlarged rectangular portion 8, in which latter portion there is a rectangular recess 9, the upper portion of the side walls of which are inclined outwardly as indicated at 10.

Within the recess 9 is mounted a bearing block 11 having a V-shaped channel 12 in its upper face. The bearing block 11 is arranged for rocking movement within the recess 9 by supporting the same on a pivot pin 13 which extends through the side walls of the recess 9 and through the block 11. The front or outer face of the bearing support is provided with a removable plate 14 to prevent the fulcrum of the main levers from becoming displaced after assembly. The cylindrical portion 7 of the bearing support is loosely mounted in the respective openings in the lugs 6. The main lever bearings, therefore, have a free movement in a rotary direction and the bearing blocks are free to oscillate on a horizontal axis on the pin 13 providing a self-alining support for the main levers. The details of the structure just described will be clear from the detailed illustration thereof in Figs. 19, 20 and 21.

The main scale levers, two of which are provided, each comprises a central longitudinal arm 15 and an inwardly extending arm 16 arranged at right angles thereto. At each end of the arm 15 is a short arm 17 extending transversely of the axis of the arm 15. The said arms 17 each has a lug 18 projecting outwardly from its face in which there is a socket for supporting the shank of the knife-edge pivot 19. The knife-edge pivot has a V-shaped portion, the apex of which extends downwardly, and a cylindrical portion that fits within the socket in the lug 18 and is removably secured therein by a set screw 20 that extends through the wall of the arm 17. On the opposite side of the axis of the arm 15, and formed integral with each of the arms 17, is a lug 21 in which is formed a socket for a knifeedge pivot 22, said pivot 22 having a V-shaped portion, the apex of which extends upwardly and the shank of which is removably mounted in the socket formed in the face of the arm 17. This bearing is adjustable by means of a pair of set screws 23 and 24 set on an angle in respect of each other and bearing against a flattened portion of the shank of the bearing 22. By adjustment of the screws 23 and 24, the bearing 22 may be turned in its socket so as to accurately adjust the bearing point of the bearing 22 in respect of the bearing 19.

From the construction just described, the details of which will be apparent from the construction shown in Figs. 12 and 13, it will be understood that the bearings 19 and 22 may be adjusted with facility and that replacements thereof in the event of wear or distortion may be readily accomplished.

Each of the arms 16 is provided with a curved nose iron 25. The curves of said nose irons that are carried by the opposed main levers are oppositely developed so that they may interfit with each other, as will more clearly appear from the description hereinafter. Each of the nose irons 25 is made adjustable longitudinally of the arm 16 to increase or decrease the effective length of the arm by a connection illustrated in detail in Fig. 14. The forward end of the arm 15 has a flattened portion 26 against which is fitted a flattened portion 27 of the nose iron. The flattened portion 27 of the nose iron has an elongated opening 32 therein through which the head 28 of a screw member 29 projects, the threaded portion of the screw fitting into a threaded opening 30 in the flattened portion of the arm 16.

The outer end walls of the opening 32 are outwardly beveled, and wedge devices 33 are mounted in said opening 32 on opposite sides of the head 28 of the screw. Each wedge device is in the form of a block, the outer ends of which are beveled to match the beveled end walls of the opening 32. The inner ends of the wedge blocks are formed to fit against the wall of the head 28 of the screw 29. Screws 34 extend through openings in the flattened portion 26 of the arm 16 and thread in the wedge blocks. Thus, by tightening and loosening the screws 34, one or the other of the wedge devices 33 will be drawn inwardly and the other extended outwardly in the opening in which it is mounted and, by the camming action of the beveled ends of the wedge devices against the beveled walls of the opening 32, an extremely accurate adjustment of the effective length of the arm 16 may be effected and maintained.

By reference to the assembly views in Figs. 1, 2 and 3, it will be noted that the main levers 15 are mounted at each side of the frame by supporting the knife pivots 19 in the bearing portion 12 of the bearing blocks 11 in such a manner that the arms 16 extend toward each other with the curved nose irons 25 interfitting at their extremities, the ends thereof overlapping.

The flexible load bearing frame, shown in detail in Figs. 6, 7 and 8, is associated with the main levers, the said frame comprising side members 35, each of which has an inwardly extending arm 36 formed integral therewith and adjacent to opposed ends of the arms of the side members 35. The free end of each of the arms 36 is flexibly connected with the opposite side member by a link 37, the upper end of which is pivoted to a lug 38 on the side member and the lower end of which is pivoted to the free end of the respective one of the arms 36. The flexibility of the load bearing frame serves to facilitate the adjustment of the fulcrum points of the levers and prevents distortion of the lever bearings in the bearing blocks.

Adjacent to each end of the side members 35 and arranged in a portion 40 on the underface thereof is an adjustable load bearing block 39, the arrangement of which is shown more particularly in Fig. 8. From this view, it will be understood that there is for each bearing a recess in the underface of the portion 40 of the side members 35 and in the recess is a bearing block 39, the lower wall of which has a V-shaped channel formed therein. Said bearing block is mounted to oscillate on a horizontal axis by supporting the same on a pivot pin 41 extending through the side walls of the recess and through the bearing block.

The load bearing frame is arranged to be supported in connection with the main scale levers by mounting the bearing blocks 39 on respective ends of the knife pivots 22. It will be understood that, by providing the adjustable bearing blocks, the connection between the load bearing frame and the main levers 15 is such that the bearings will be self-alining and that any oscillation of the load bearing frame will be compensated for without transmission of the oscillation to the main scale levers.

The floating underslung frame that supports the scale platform is shown in detail in Figs. 4 and 5. This member comprises a rectangular frame 42 having outwardly extending integral arms 43 at each corner thereof. By reference to the assembly drawings, it will be understood that the underslung frame is mounted below the scale levers and adjacent to the bottom of the main frame of the scale and is connected with the load bearing frame by suspension rods 44. The rods 44 provide flexible and self-centering connections between the underslung frame and the load bearing frame, the supports being located adjacent to the outer corners of the two frames.

In order that there may be a relative swinging motion between the underslung floating frame and the load bearing frame, the rods 44 are connected with the latter by a specially designed construction. This construction will be apparent by reference to Fig. 8 from which it will be understood that there is a tapered opening 45 widening towards the bottom and extending vertically through the end members 35 adjacent to each end thereof. The upper wall of the opening 45 is preferably recessed at 46 and a hard metal washer 47, having an axial opening therein in extension of the taper of the opening 45, is mounted in said recess 46. The upper end of each of the rods 44 extends through the respective opening 45 and through the opening in the washer 47. Inasmuch as the opening 45 is of larger diameter at the bottom than at the top, any oscillation of the underframe will permit a gyration of the rod 44 within the opening 45 without imparting any vibration to the load bearing frame. Each of the rods 44 is releasably supported and held in adjustment by a pair of locking nuts 48. The face of the under nut is in a plane perpendicular to the axis of the opening, so that the rods will be self-centering and resume a point of rest quickly after being oscillated. The washer 47 may be omitted if desired and the opening 45 extended through the full thickness of the frame. It will be understood that the lower end of each of the rods 44 extends through an opening 49 in one of the arms 43 near the outer extremity of the underslung frame 42, and is provided with locking nuts upon which the frame is supported.

Extending vertically from the upper face of each of the arms 43 is a standard which may be in the form of an angle iron 50. These standards extend upwardly above the plane of the top of the scale frame and are arranged to support the scale platform adjacent to the four corners thereof.

The platform, the reverse plan view of which is shown in Fig. 22, preferably includes a top plate 51 with a downturned marginal edge 52 that fits over the upper edge of the vertical wall of the forward portion 3 of the base frame. The reverse face of the platform is preferably made with strengthening ribs 53 and is removably mounted on the standards 50.

In order to conveniently mount the platform and to prevent displacement thereof, the underface of the platform carries abutment members that comprise inwardly extending lugs 54 disposed at right angles to each other and opposite the plane of the faces of the angle supports 50, the lugs extending inwardly from the marginal edge 52 of the platform. The abutment members further include a depending lug 55 extending downwardly from the top wall of the platform and spaced from the extremities of the lugs 54 so as to provide an intermediate space to receive the walls of the standards 50, the lugs 55 being within the angle of the supports 50. This arrangement prevents a displacement of the platform.

From the description thus far given, it will be understood that the loading of the platform may occur without tilting the platform and without transmitting the vibration incident to the loading operation to the load bearing frame or to the main levers of the scale. It will also be observed that the platform is supported adjacent to the four corners thereof in such a way that there is no appreciable leverage incident to placing the load in any marginal edge of the platform, effectively preventing the tilting thereof even in the event of an excessive load being concentrated at any restricted area of the platform.

It will also be noted that the relationship of the load bearing frame to the main lever is such that the load is transmitted to the extremity of the main lever, which is fulcrumed intermediate the point of load and the power of the lever developed upon the raising of the arm 16 in turn is transmitted to the transverse extension lever of the scale. Thus, it appears that the main levers of the scale are levers of the first class, thereby permitting the load to be carried near the margins of the load supporting area.

The transverse extension lever that transmits power from the main levers to the steelyard rods comprises a frame 56 pivoted intermediate of its ends on a support which comprises a grid bar 57, the ends of which are recessed so that it may be removably connected with the rear pair of lugs 6 carried by the main frame 1 of the scale, and releasably held in position by set screws 58. The bar 57 carries at spaced intervals horizontal brackets 59 and connected with the brackets 59 is a plate 60. The plate 60 carries spaced V-bearing blocks for the fulcrum of said transverse extension lever. The connection between the brackets 59 and the plate 60 is such that said plate 60 may be laterally adjusted in respect to the brackets. This adjustment is effected by providing an opening 62 through the wall of each of the brackets 59, which opening is larger than the diameter of a screw 63 that extends through said opening threaded into an opening 64 in the plate 60.

At each side of the frame 56 that constitutes the transverse extension lever is a knife-edge pivot 65 releasably mounted in a socket therefor formed as a part of the frame 56, said pivot being releasably held in adjustment by set screws 66. The apex of the V of the pivot extends upwardly and seats in the V-blocks on each side of the frame.

The forward end of the transverse extension lever is connected with the two main levers by adjustable shackles, the details of construction of which are shown in Figs. 17 and 18. Each of the shackles comprises side plates 67 between the upper ends of which are transverse walls 68. Pivotally supported between the walls 68 on a pivot pin 69 is a V-bearing block 70 having the V-groove in its under face. This V-groove bearing block fits over a knife pivot 71 carried transversely of the end of the nose iron 25 of the main lever. Between the plates 67 near the lower extremity thereof is a V-bearing block 72 carried on a pivot pin 73, the said block 72 having the V-groove in its upper face.

The frame 56 carries at its forward extremity a transverse V-bar 74, the apex of which extends downwardly and comprises two knife pivots which seat in the respective ends of the V-bearings 72 of the main lever shackle. Intermediate the bearing blocks 70 and 72, and extending across the space therebetween, is a screw 75 that acts as an abutment and prevents the displacement of the lever bearings.

It will be noted that the construction of the shackle just described provides for a flexible and self-alining connection between the main levers and the transverse extension lever, providing an accurate alinement and adjustment of these connections in operation.

The rear extremity of the transverse extension lever 56 is provided with a nose iron 76 which is adjustable endwise of the lever by reason of the fact that it is equipped with an adjustable connection of the same construction as that of the main levers 15 with their respective nose irons 25. As the construction is a duplicate of that already described, it is unnecessary to repeat the description thereof in detail. At the extremity of the nose iron is a V-pivot 78.

The rear extremity of the transverse extension lever is connected with the steelyard rod 79 by a specially designed shackle that comprises a frame 80, the upper wall of which is provided with an internally threaded boss 81 for receiving the threaded end 82 of the steelyard rod 79, the connection between the shackle and the end of the rod being locked by a lock nut 83. At the lower extremity of the frame 80, a V-bearing block 84 is mounted on a pivot pin 85 supported in transverse walls 77 formed integral with the side members of the frame 80 having the V-groove in its upper face and in which the V-pivot 78 of the transverse extension lever nose iron seats.

Secured through the wall of the side members of the frame 80 are a pair of hardened metal screws 86 that intersect the V-groove of the bearing block 84 providing anti-friction contact with the ends of the V-pivot 78. Between the side members of the frame 80 and extending across the space intermediate thereof is a screw 87 that serves as an abutment to prevent the displacement of the connection between the transverse extension lever and the steelyard rod.

From the foregoing description, it will be apparent that the invention as described is adapted for carrying out the purposes and functions set out as the basis of the invention, and that it also has details of construction resulting in facility of adjustment and repair. I am aware that the invention may be modified in numerous particulars without departing from the spirit and scope thereof.

What I claim and desire to secure by Letters Patent is:—

1. In a scale, the combination of a pair of main levers, adjustable bearings arranged to support the levers on parallel axes, a load bearing frame supported by the outwardly extending arms of the levers, an underslung frame, flexible connections between the underslung frame and said load bearing frame, and means for supporting a load platform by said underslung frame.

2. In a scale the combination of a frame, alined adjustable bearings at opposite sides of said frame, main levers mounted in said bearings having outwardly extending arms terminating adjacent to the corners of the frame and inwardly extending arms terminating adjacent to each other, a load bearing frame carried by the outwardly extending arms of said main levers, depending suspension rods loosely mounted in said load bearing frame, an underslung frame suspended on said rods, vertical supports carried by said underslung frame, and a load platform carried by said supports.

3. In a scale the combination of a main frame, bearing blocks arranged in alined pairs at each side of said frame, said bearing blocks having a pivot support for movement on a vertical axis and a pivot support for rocking movement on a horizontal axis, main levers supported by each pair of bearing blocks, means for transmitting the load to said main levers, a transverse extension lever, a flexible connection between the inwardly extending arms of the main levers and said extension lever, and a flexible connection between the extension lever and the steelyard rod of the scale.

4. In a scale a main frame, a pair of main levers of the first class fulcrumed in said frame on parallel axes and having outwardly extending arms terminating adjacent to the margin of the frame and inwardly extending arms terminating adjacent to each other, a frame carried by the outwardly extending arms of said main levers, a second frame, flexible connections for connecting said second frame with said first named frame, and means for transmitting the movement of the inwardly extending arms of the main levers to weight indicating mechanism.

5. In a scale a main frame, a pair of main levers of the first class fulcrumed in said frame on parallel axes and having outwardly extending arms adapted to support the load and inwardly extending arms movable responsive to the load, a flexible load bearing frame connected with the outwardly extending arms of the main levers, an under frame, suspension rods supporting the under frame adjacent to the corners thereof, said rods having loose pivot connection with said load bearing frame and with said under frame, a load supporting structure supported by the under frame, and means for registering the extent of movement of the inwardly extending arms of the main levers.

6. In a scale a main frame, a pair of main levers of the first class fulcrumed in said frame on parallel axes and having outwardly extending arms adapted to support the load and inwardly extending arms, weighing mechanism connected with the inwardly extending arms, a flexible load supporting structure supported by the outwardly extending arms, an under frame, vertical supports carried by the under frame, a platform mounted on said supports, and suspension rods supporting the under frame adjacent to the corners thereof, said rods having free pivot movement with the under frame and with said load supporting structure.

7. In a scale the combination with main levers, of a load supporting frame having openings therein, rods mounted in said openings, members for pivotally connecting said rods in said openings, an under frame, connections between said rods and said under frame, and a load supporting platform carried by said under frame.

8. In a scale a main frame, main levers including a member extending along the side of the frame and outwardly extending arms near the extremities of said member and an inwardly extending arm from a point intermediate of the length of said members, a pair of bearings for each main lever, a flexible frame supported on the outwardly extending arms of said main levers, an under frame, a platform supported by the under frame, and flexible connections between the under frame and said first named frame.

9. In a scale, a lever system having outwardly extending arms on the main levers, a frame supported on the outwardly extending arms of said main levers, an under frame, a platform supported by the under frame, and flexible connections between the under frame and said first named frame.

10. In a scale, a lever system having outwardly extending arms on the main levers, a frame supported on the outwardly extending arms of said main levers, an under frame, connections between the under frame and said first named frame, and pivot supports for said connections whereby said under frame and said first named frame have a relative movement in respect of each other.

LOUIS S. SHIVELY.